United States Patent

Hesline

Patent Number: 5,864,428
Date of Patent: Jan. 26, 1999

[54] POLARIZING DEVICE

[76] Inventor: Raymond Hesline, 31 Lilac Street, East Bentleigh, Victoria, Australia, 3165

[21] Appl. No.: 217,739

[22] Filed: Mar. 25, 1994

Related U.S. Application Data

[62] Division of Ser. No. 807,864, Jan. 13, 1992, abandoned.

[51] Int. Cl.⁶ .............................. G02B 5/30; G02B 27/28
[52] U.S. Cl. ............................... 359/496; 359/497
[58] Field of Search ...................... 359/484, 487, 359/494, 495, 496, 497, 499, 500

[56] References Cited

U.S. PATENT DOCUMENTS

| | | | |
|---|---|---|---|
| 3,399,591 | 9/1968 | Drougard et al. | 359/496 |
| 3,438,692 | 4/1969 | Tabur | 359/496 |
| 3,503,670 | 3/1970 | Kosanke et al. | 359/497 |
| 3,572,895 | 3/1971 | Schmidt | 359/495 |
| 3,720,457 | 3/1973 | Swartz et al. | 359/495 |
| 3,982,819 | 9/1976 | Letellier | 359/496 |
| 4,548,478 | 10/1985 | Shirasaki | 359/484 |
| 4,575,193 | 3/1986 | Greivenkamp, Jr. | 359/495 |
| 4,656,433 | 4/1987 | Franklin et al. | 359/495 |
| 5,440,428 | 8/1995 | Wu et al. | 359/496 |

FOREIGN PATENT DOCUMENTS

| | | | |
|---|---|---|---|
| 2150679 | 4/1973 | France | 359/496 |
| 1141802 | 12/1962 | Germany | 359/496 |
| 0054906 | 4/1982 | Japan | 359/496 |
| 0130920 | 6/1986 | Japan | 359/484 |
| 0205801 | 8/1990 | Japan | 359/496 |
| 0530301 | 9/1976 | U.S.S.R. | 359/499 |
| 0459171 | 7/1937 | United Kingdom | 359/496 |
| 1468051 | 3/1977 | United Kingdom | 359/496 |

*Primary Examiner*—Ricky D. Shafer

[57] ABSTRACT

A polarizing device which separates a beam (1) into polarized component beams (9) and (10) by transmitting both components through isotropic element/space (3) and birefringent elements (2) and (4).

1 Claim, 2 Drawing Sheets

POLARIZING DEVICE

TECHNICAL FIELD

This invention is a division of patent application Ser. No. 07/807,864, filing date Jan. 13th, 1992, now abandoned and relates to birefringent polarizers and polarizing beam-splitters which separate polarization components by transmitting both said components through an interface.

BACKGROUND ART

Many polarizers and polarizing beam-splitters are known to the art, each having disadvantages.

The Glan-Thompson polarizer, which is a block of birefringent material cut into prisms and then cemented together acts by reflecting one polarization component at the cement interface and by transmitting the other. The device requires a considerable amount of birefringent material, generally calcite, which is scarce and expensive, and is unable to work with high powered lasers and ultraviolet light, since the light destroys or clouds cement.

The Glan-Thompson polarizing beam-splitter, which makes use of the reflected polarization component, suffers from the added disadvantage that polarized beams exit said device at inconvenient angles, for example 45 degrees, when it is often useful that beams are parallel, orthogonal or otherwise oriented.

The Glan-Taylor polarizer which is similar to the Glan-Thompson polarizer but uses an air space instead of cement to separate polarization components can work with many light sources but suffers from reflection loss and ghosting caused by the air gap.

The Wollaston, Rochon and Senarmont beam-splitters, which separate polarization components by transmitting said components through an interface, permit optical contacting for use with most light sources, but produce beams which also exit at inconvenient angles, with one or both polarization components suffering from chromatism and distortion.

The double refracting element (beam displacer), which produces accurately parallel polarized beams of light, achieves small beam separation and limited field. Also, since the beams may pass through a considerable amount of material before achieving useful separation, wavefront distortion can occur in the extraordinary beam, due to imperfections in the crystal's structure. (See, for example, "Birefringence of Quartz and Calcite," *Journal of the Optical Society of America*, volume 49, number 7, July 1959, pages 710–712). Beam separation can be further limited by the small size and high cost of suitable crystals.

Polarizing prisms and their various defects are described in detail by H. E. Bennett and J. M. Bennett, "Polarization," in *Handbook of Optics*, W. G. Driscoll and W. Vaughan, Editors, McGraw-Hill, New York, 1978.

DISCLOSURE OF THE INVENTION

It is an object of this invention to provide a birefringent polarizing beam-splitter in which polarized beams of electromagnetic radiation may emerge from the device being free from chromatism and distortion.

It is also an object of th e invention to provide a polarizing beam-splitter in which polarized beams of electromagnetic radiation may emerge from said device being oriented at convenient angles.

It is another object of the invention to provide a polarizing beam-splitter which may be conservative in the use of birefringent material.

It is a further object of the invention to provide a beam displacer which may causes less wavefront distortion in the extraordinary beam than a known birefringent beam displacer.

It is a still further object of the invention to provide an improved polarizer.

To this end, in accordance with the invention, the polarizing device is characterised by two unitary elements of birefringent material with parallel opposing surfaces symmetrically arranged about a central isotropic element or space, the optic axes of said birefringent elements being substantially in the same direction and so arranged that the angle of divergence of the ordinary and extraordinary rays formed within said device is increased as said rays are passed from the first said birefringent element to said isotropic element or space.

DESCRIPTION OF PREFERRED EMBODIMENTS

Figure 1:
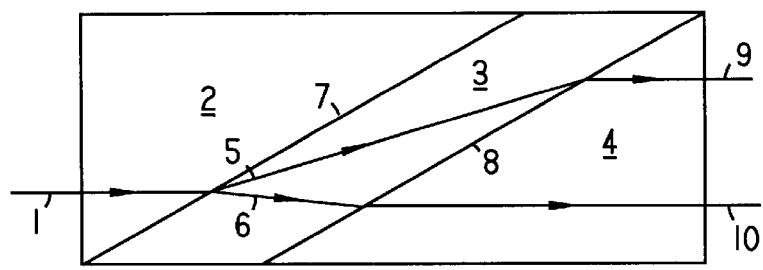
FIG. 1 represents an embodiment in accordance with the invention describing how parallel polarized beams are obtained using an isotropic element.

FIG. 1 represents an embodiment in accordance with the invention describing how parallel polarized beams are obtained using an isotropic element, in which a beam of electromagnetic radiation 1 enters first birefringent element 2 and passes into an isotropic element 3, which is plane parallel, so that beam 1 separates into orthogonally polarized beams 5 and 6. Since element 2 is double refracting, the beams separate by encountering different refractive indices, as known.

The refractive indices of elements on either side of element 3 are the same for the same polarization components, and so once beams 5 and 6 have passed through element 3, with faces 7 and 8 parallel, said beams will pass into element 4 parallel to related components in 2.

After leaving element 4 component beams become beams 9 and 10 which are parallel to each other and parallel to input beam 1, being free from chromatism and distortion.

Figure 2:
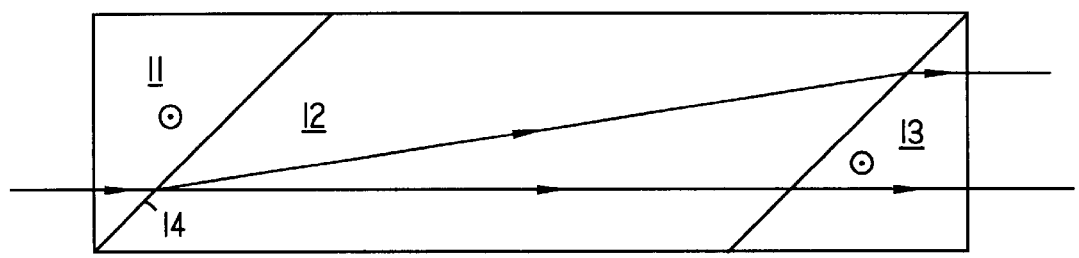
FIG. 2 represents an embodiment in accordance with the invention being a beam displacer, similar to a known beam displacer made of calcite, in which the amount of calcite is reduced.

FIG. 2 represents an embodiment in accordance with the invention being a beam displacer, similar to a known calcite beam displacer, wherein the amount of calcite is reduced.

In the embodiment elements 11 and 13 are 45 degree calcite prisms with optic axes oriented normal to the plane of the drawing, and element 12 is an isotropic plane parallel element with a refractive index similar to that of the extraordinary beam in calcite.

In said known beam displacer beam separation is 6.2 degrees. In this embodiment beam separation is 7.1 degrees. If elements 11 and 13 are optically contacted to element 12, Fresnel reflection at surface 14 will be less than 0.03 percent for the P polarized component and zero for the S polarized component. This is because the P polarized component passes through the interface at an angle close to Brewster's angle.

For said embodiment, wavefront distortion in the extraordinary beam can be reduced by about 80 percent, as can the amount calcite. This permits the construction of large beam displacers.

Figure 3:
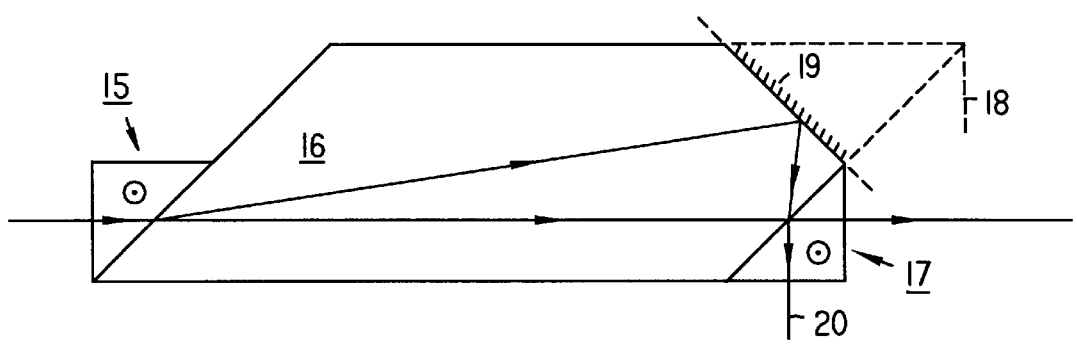
FIG. 3 represents an embodiment in accordance with the invention, wherein beams emerge at orthogonal angles.

FIG. 3 represents an embodiment in accordance with the invention, wherein beams emerge orthogonal to one and other.

Prisms 15 and 17 have optic axes normal to the plane of the drawing and element 16 is isotropic with a refractive index similar to that of the extraordinary ray in calcite, as in the previous embodiment. Section 18, shown by dotted lines, which would normally be the upper section of the previously described beam displacer, is here the section below reflecting surface 19. Beam 20 will leave prism 17 as if from said section 18, being free from chromatism and distortion.

This embodiment can be used with high powered light sources if optical contacting is employed. Synthetic fused silica or Schott optical glass BK 7 could be used, for example, as an isotropic material. Further embodiments using other birefringent and isotropic materials will be evident.

Steel, Smartt and Giovanelli have successfully contacted glass and calcite (*Australian Journal of Physics*, volume 14, 1961, page 209), and since it is difficult to produce surfaces of the required flatness in prisms (F. Twyman, "Prism and Lens Making," second edition, Hilger & Watts, London, 1952) then in these embodiments the first and third elements could be polished to required flatness as plane parallel sections, later being divided to provide separate elements.

Glan-Taylor and Glan-Focault polarizers, which consist of birefringent prisms separated by an air gap, work by transmitting one polarization component at said gap and by reflecting the other component. A problem with this type of polarizer is that reflection loss occurs at the air gap along with ghosting. By allowing both polarization components to be transmitted it is possible to reduce this reflection loss and also to provide a polarizing beam-splitter which has the advantages of an air spaced polarizer.

Figure 4:
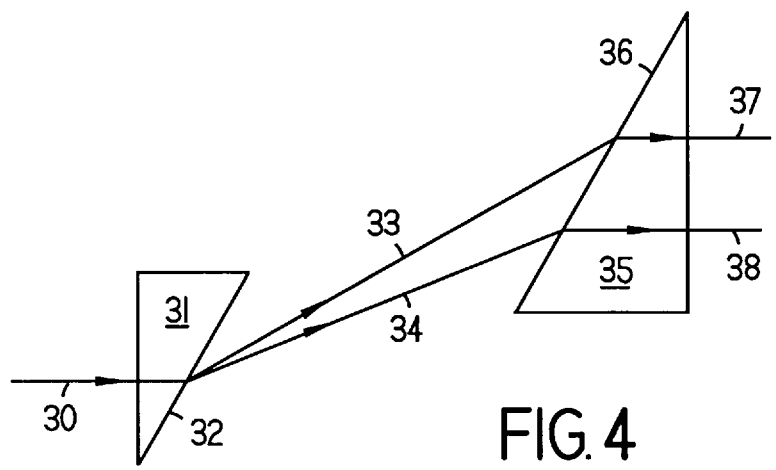
FIG. 4 represents an embodiment in accordance with the invention being a beam-splitter which includes an air space.

FIG. 4 represents an embodiment in accordance with the invention comprising two birefringent prisms and an air space. As shown, beam 30 enters prism 31 and is split at face 32 into orthogonally polarized beams 33 and 34. Said beams, after travelling through the air space, pass into prism 35. Prisms 31 and 35 have the same optic axis orientations and faces 32 and 36 are parallel, so beams 33 and 34 will enter prism 35 and exit said prism as parallel beams 37 and 38. Thus in passing through the two prisms input beam 30 will be separated into parallel, orthogonally polarized output beams 37 and 38.

If the optic axes of the elements are normal to the plane of the drawing, as with a Glan-Focault prism then, in the drawing, the upper beam will suffer smaller reflection loss than the lower beam. This is because the electric field of the upper beam is parallel to the plane of incidence, being P polarization, which in this case passes through the interface close to or at Brewster's angle. By also coating hypotenuse faces with antireflection films, reflection loss at said faces can be reduced for the other polarization component.

Figure 5:
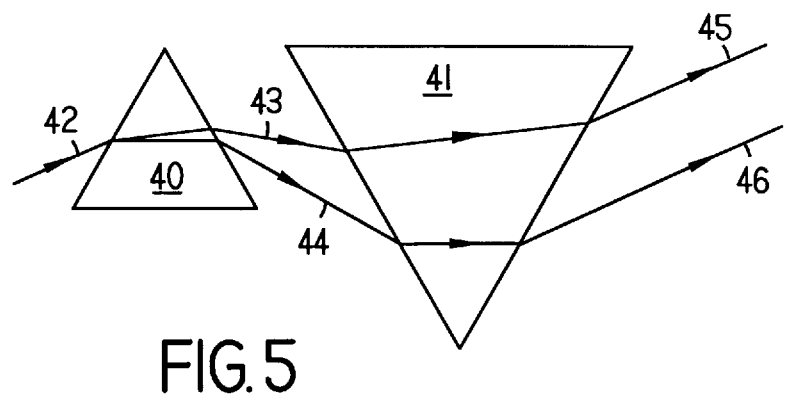
FIG. 5 represents an embodiment in accordance with the invention being a beam-splitter wherein Brewster prisms are used to reduce reflection loss for one polarization component.

FIG. 5 represents an embodiment in accordance with the invention being a polarizer in which reflection loss at every faces, as calculated from Fresnel's equation, is reduced to zero for one polarization component. In this embodiment beam 42 enters prism 40 and is split into orthogonally polarized components 43 and 44. These components then pass into prism 41. If the optic axes of said prisms 40 and 41 are oriented normal to the plane of the drawing, beam 42 will become parallel beams 45 and 46 with beam 46 being the ordinary beam which passes through each prism at Brewster's angle.

Modifications and variations to the described embodiments will be apparent to those skilled in the art and all such modifications and variations should be considered as within the scope of the present invention.

I claim:

1. A polarizing device comprising first and second unitary birefringent elements composed of the same birefringent material, arranged about a central continuous space or against a central isotropic element, wherein the optic axes of said birefringent elements are parallel to one and other and so arranged that an ordinary and extraordinary polarization component rays of an input ray diverge as said component rays are transmitted from the first birefringent element to said space or said isotropic element, each of said birefringent elements has non parallel input and output faces, the output face of the first birefringent element is parallel to the input face of the second birefringent element, wherein at least one of said polarization component rays of said input ray travels in a parallel direction in said birefringent elements and the input face of the first birefringent element is parallel to the output face of the second birefringent element.

* * * * *